(12) United States Patent
Williams (10) Patent No.: US 10,194,578 B2
(45) Date of Patent: Feb. 5, 2019

(54) AIR PACK MANIFOLD HAVING ARTICULATED CONTROL

(71) Applicant: CNH Industrial Canada, Ltd., Saskatoon (CA)

(72) Inventor: Andrew Williams, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 115 days.

(21) Appl. No.: 15/265,489

(22) Filed: Sep. 14, 2016

(65) Prior Publication Data

US 2018/0000007 A1 Jan. 4, 2018

Related U.S. Application Data

(60) Provisional application No. 62/357,030, filed on Jun. 30, 2016.

(51) Int. Cl.
| | |
|---|---|
| *A01C 7/08* | (2006.01) |
| *A01C 15/04* | (2006.01) |
| *F16L 3/223* | (2006.01) |
| *A01C 7/06* | (2006.01) |

(52) U.S. Cl.
CPC .............. *A01C 7/082* (2013.01); *A01C 7/081* (2013.01); *A01C 7/084* (2013.01); *A01C 15/04* (2013.01); *F16L 3/2235* (2013.01); *A01C 7/06* (2013.01); *Y02P 60/16* (2015.11); *Y02P 60/23* (2015.11)

(58) Field of Classification Search
CPC ......... A01C 7/042; A01C 7/081; A01C 7/082; A01C 7/084; A01C 15/04; F16L 33/02; F16L 33/03; F16L 33/12; F16L 33/221; F16L 37/096; F16L 37/127; F16L 3/2235; A47B 46/00; A47B 46/005; A47B 49/00
USPC .......... 406/123; 110/287–288; 285/242, 308, 285/317, 320; 239/650–689; 280/420–422; 248/89–93, 68.1; 211/163–165, 168–171
See application file for complete search history.

(56) References Cited

U.S. PATENT DOCUMENTS

| | | | | |
|---|---|---|---|---|
| 5,651,519 A * | 7/1997 | Goodrich | ............. | B25J 19/0025 248/51 |
| 6,378,279 B1 * | 4/2002 | Smith | .................. | A01B 71/066 137/355.17 |
| 6,752,360 B2 * | 6/2004 | Bennett | .................. | F16L 3/2235 24/16 R |
| 7,017,676 B2 * | 3/2006 | Neufeld | ............... | A01B 73/005 172/452 |

(Continued)

*Primary Examiner* — Alicia Torres
(74) *Attorney, Agent, or Firm* — Rebecca L. Henkel; Rickard K. DeMille (57) ABSTRACT

A pneumatic distribution system for use with agricultural equipment, such as air drills and air carts, includes hoses which may be held at a manifold connection having articulated control. The manifold connection may hold multiple couplers for hoses, and each of the couplers may be configured to allow substantial rotation in a first plane perpendicular to the ground. In addition, the manifold connection may be configured to allow substantial rotation in a second plane parallel to the ground. As a result, the manifold connection may be held proximal to a mechanical hitching point between agricultural equipment. This, in turn, may allow elimination of excess hose lengths and greater ease of handling when the agricultural equipment is separated and the hoses are disconnected.

19 Claims, 5 Drawing Sheets

(56) References Cited

U.S. PATENT DOCUMENTS

2014/0261810 A1 9/2014 Bent et al.
2015/0359165 A1 12/2015 Roberge et al.
2016/0128264 A1* 5/2016 Olivares .............. A01B 73/005
　　　　　　　　　　　　　　　　　　　　111/55

* cited by examiner

AIR PACK MANIFOLD HAVING ARTICULATED CONTROL

CROSS-REFERENCE TO RELATED APPLICATIONS

This is a non-provisional application based upon U.S. provisional patent application Ser. No. 62/357,030, entitled "Air Pack Manifold Having Articulated Control," filed Jun. 30, 2016, which is incorporated herein by reference.

FIELD OF THE INVENTION

The present invention relates to farm implements and, more particularly, to a pneumatic distribution system for use with agricultural equipment in which an air pack manifold may provide couplers for routing pneumatic hoses between agricultural equipment while providing articulated control.

BACKGROUND OF THE INVENTION

Air carts and air drills are commonly towed together by tractors to apply seed, fertilizer, micro-nutrients or other granular agricultural product to a field. Air carts typically include a hopper having one or more compartments configured for holding such product. Air carts also typically include a pneumatic distribution system, including blower assemblies, metering units and primary hoses, for delivering the product from the air cart to the air drill. Air drills are typically towed adjacent to air carts, and often include secondary hoses connected to the primary hoses at headers. Air drills also typically include row units in communication with the secondary hoses which may operate to open a row in a field, receive product from the air cart, and subsequently close the row over the distributed product. In one such application, some compartments of the air cart may be filled with seed while other compartments may be filled with fertilizer.

It is sometimes necessary to separate the air cart from the air drill, for example, when changing between field operations or performing equipment maintenance. To separate the air cart from the air drill, a mechanical hitching point between the air cart and the air drill is typically released. In addition, the primary hoses running between the air cart and the air drill are also typically disconnected at an air pack manifold connection. To allow for secure and rigid mounting of the primary hoses, and to reduce the stresses that flexing hoses could impart (such as during bumps or turns), the manifold connection is typically positioned closer to the air cart body on one end, or closer to the air drill body on the other end, and further from the hitching point between the air cart and the air drill.

However, having the air pack manifold connection separated a longer distance from the hitching point oftentimes makes handling the air cart or air drill difficult when separated and operating as a standalone piece of equipment, such as for transportation or storage. This problem may manifest itself in the form of excess hose lengths which must be accounted for in some way for safely transporting and/or storing the equipment. This is further complicated by the fact that such hoses may be long, heavy and cumbersome to manipulate, thereby making the connection and disconnection of such hoses difficult and unnatural for the operator. What is needed is an improved system for providing such hoses in agricultural systems, which may be more convenient for the operator.

SUMMARY OF THE INVENTION

The present invention provides a pneumatic distribution system for use with agricultural equipment, such as air drills and air carts, in which hoses may be held at a manifold connection having articulated control. The manifold connection may hold multiple couplers for hoses, and each of the couplers may be configured to allow substantial rotation in a first plane perpendicular to the ground. In addition, the manifold connection may be configured to allow substantial rotation in a second plane parallel to the ground. As a result, the manifold connection may be held proximal to a mechanical hitching point between agricultural equipment. This, in turn, may allow elimination of excess hose lengths and greater ease of handling when the agricultural equipment is separated and the hoses are disconnected.

In one aspect, a device may be provided having articulated control at an attachment point for a pneumatic conveying line. By providing supported rotation along multiple axes, the pneumatic line may be able to respond to its environment without placing mechanical stress or strain on the connection interface of the line.

Depending on the agricultural equipment configuration, the manifold location may be placed closely to the hitch of either the air drill or the air cart, rather than at a rear frame of the air drill or the air cart. With support for rotational motion at the connection joint, this allows for placement of the air pack break point much closer to the mechanical disconnection point between the air cart and the air drill. This relocation, in turn, makes the air pack hoses much easier to access and manipulate.

In one aspect, each pneumatic line may have an individual connector that controls the axis of rotation perpendicular to the longitudinal axis of the air pack line. Multiple individual connectors can be combined into a larger manifold that provides controlled rotation, perpendicular to the line and the first axis of rotation. These individual connectors can also be moved around within the manifold to satisfy various hose routing configurations. Also, an axis may be controlled by the manifold which may be held in place by a cross pin. Allowing these rotational degrees of freedom may reduce stresses on the connection point as the air pack bends and flexes to the movement of the air cart and air drill. Moreover, by allowing motion at the connection point, strain of the hoses may be decreased, which may reduce field failures of hoses which may be due to stress cracking.

In alternative aspects, different types of materials could be used, such as plastic components to provide corrosion resistance and improved economics over stainless steel, and pins or flexible materials, such as rubber or plastic products, for pivoting mechanisms.

Specifically then, one aspect of the present invention may provide a pneumatic distribution system for agricultural equipment including: a frame supporting multiple couplers, each coupler having a connector configured to retain a pneumatic distribution hose when mounted to the coupler, in which each coupler may be independently configured to rotate in a first plane perpendicular to the ground; and a post vertically supporting the frame, the post having a slot configured to receive a cross pin, in which the post may be configured to rotate within a boundary defined by the slot to allow the frame to rotate in a second plane parallel to the ground.

In another aspect, the present invention may provide an agricultural product delivery system including: a chassis supported by multiple wheels; a hitching point for towing the chassis; multiple primary hoses; and a manifold vertically supported by a post mounted proximal to the hitching point, the manifold having a frame supporting multiple couplers, each coupler having a first end receiving a primary hose and a second end having a connector configured to retain a pneumatic distribution hose when mounted to the coupler, in which each coupler may be independently configured to rotate in a first plane perpendicular to the ground, in which the post includes a slot configured to receive a cross pin, and in which the post may be configured to rotate within a boundary defined by the slot to allow the frame to rotate in a second plane parallel to the ground.

In another aspect, the present invention may provide an air seeder system including: an air cart supported by multiple wheels, the air cart having: a hopper configured to hold agricultural product; multiple air cart hoses; metering units configured to meter agricultural product from the hopper to the air cart hoses; blower assemblies configured to entrain the agricultural product in the air cart hoses; an air cart hitching point; and a manifold vertically supported by a post mounted proximal to the hitching point, the manifold having a frame supporting multiple couplers, each coupler having a first end receiving an air cart hose and a second end having a connector configured to retain an air drill primary hose mounted to the coupler, in which each coupler may be independently configured to rotate in a first plane perpendicular to the ground, in which the post includes a slot configured to receive a cross pin, and in which the post may be configured to rotate within a boundary defined by the slot to allow the frame to rotate in a second plane parallel to the ground; and an air drill supported by multiple wheels, the air drill having: an air drill hitching point in communication with the air cart hitching point; multiple headers; multiple air drill primary hoses, each air drill primary hose coupling a header to a second end of the manifold; multiple row units; and multiple air cart secondary hoses, each air cart secondary hose coupling a header to a row unit, in which each row unit may be configured to open a row in a field, deposit agricultural product in the row, and close the row over the agricultural product.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
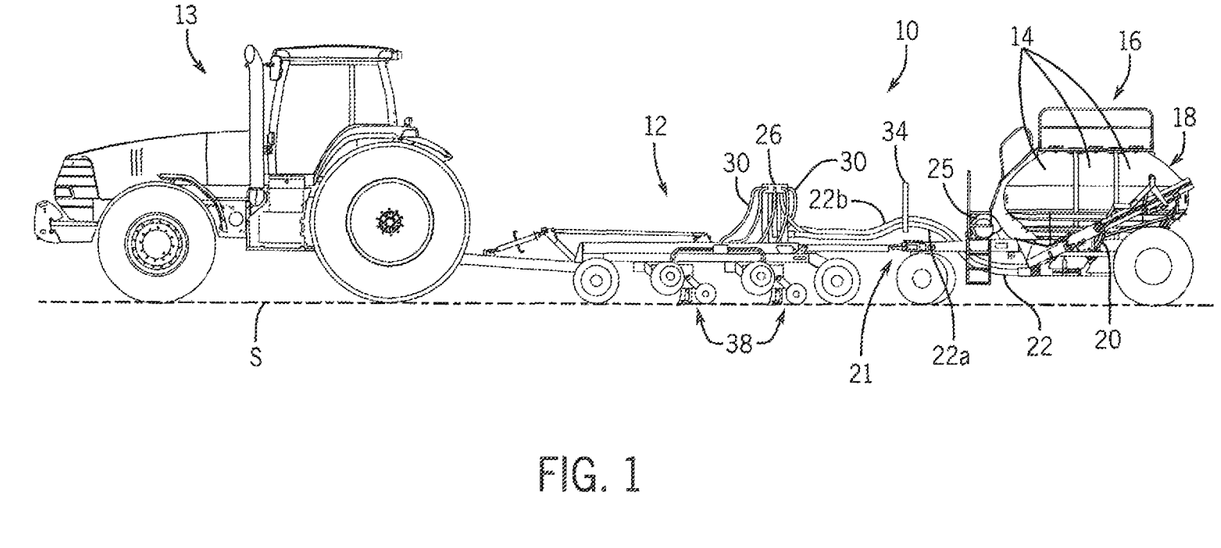
FIG. 1 is a schematic diagram illustrating an agricultural vehicle pulling an air drill and an air cart in which a manifold providing articulated control is used for routing pneumatic distribution hoses to row units according to the present invention.

Referring to FIG. 1, an exemplary air seeder system 10 may include an air drill 12 and an air cart 16 coupled to an agricultural vehicle 13 for towing in a conventional manner. As is known in the art, the air cart 16 may include a chassis supported by multiple wheels and may have a large hopper 18 that holds a quantity of particulate matter, e.g., seed and/or fertilizer, and metering units 20 that meter the particulate matter from the hopper 18 to the air drill 12. The hopper 18 may include multiple compartments 14, each of which may be configured to carry separate products, e.g., seed and/or fertilizer. The size of the hopper 18 and of the individual compartments 14 may vary according to various configuration of the air cart 16. The metering units 20 may be in communication with each compartment 14 to allow individual control over the manner in which product is dispensed from the compartments 14. One exemplary air cart is a Precision Air cart which is commercially available from CNH America, LLC.

The air drill 12 may have a chassis supported by multiple wheels and may be mechanically linked with the air cart 16 at a hitching point 21 in a conventional manner. In addition to being mechanically linked, the air cart 16 and the air drill 12 may be interconnected by multiple pneumatically driven air/product hoses or primary hoses 22. Air may be supplied to the primary hoses 22 by one or more blower assemblies 25 which may be generally mounted adjacent the front of the hopper 18 and adjacent the metering units 20. Alternatively, the one or more blower assemblies 25 may be mounted rearward of the hopper 18 or adjacent a side of the hopper 18. As known in the art, the one or more blower assemblies 25 may create turbulent air flows that force the particulate matter metered by the metering units 20 into and along the primary hoses 22. The particulate matter may be entrained in the air flow created by the blower assemblies 25 and communicated from the air cart 16 through the primary hoses 22 to the headers 26 mounted to and supported by the air drill 12. The headers 26 may be positioned along the air drill 12. Each header 26 may then be in fluid communication with a set of conduits or secondary hoses 30 that deliver its portion of the air/product mixture to row units 38 which may be configured in a conventional manner to deposit the particulate matter onto the ground "G" (seeding surface).

An air pack manifold 34 providing articulated control may be used for routing the primary hoses 22. The manifold 34 may hold multiple couplers for connecting the primary hoses of the air cart 16 (primary hoses 22*a*) to the primary hoses of the air drill 12 (primary hoses 22*b*). The couplers may be configured to allow substantial rotation in a first plane perpendicular to the ground (vertically/up and down). In addition, the manifold 34 may be configured to allow substantial rotation in a second plane parallel to the ground (horizontally/left and right). As a result of such articulated control, the manifold 34 may be positioned proximal to the mechanical hitching point 21 between the air cart 16 and the air drill 12. This, in turn, may allow for elimination of excess hose lengths and greater ease of handling when the air cart 16 and the air drill 12 are separated and the primary hoses 22 are disconnected.

Although the manifold 34 in FIG. 1 is illustrated as being vertically supported by a post mounted proximal to the hitching point 21 on the air cart 16, in an alternative aspect, the manifold 34 could be vertically supported by a post mounted proximal to the hitching point 21 on the air drill 12. It is therefore contemplated that the air cart 16, the air drill 12 and/or other agricultural product delivery systems could each include such receptacles for receiving posts for mounting the manifold 34 to accommodate a variety of configurations.

Figure 2:
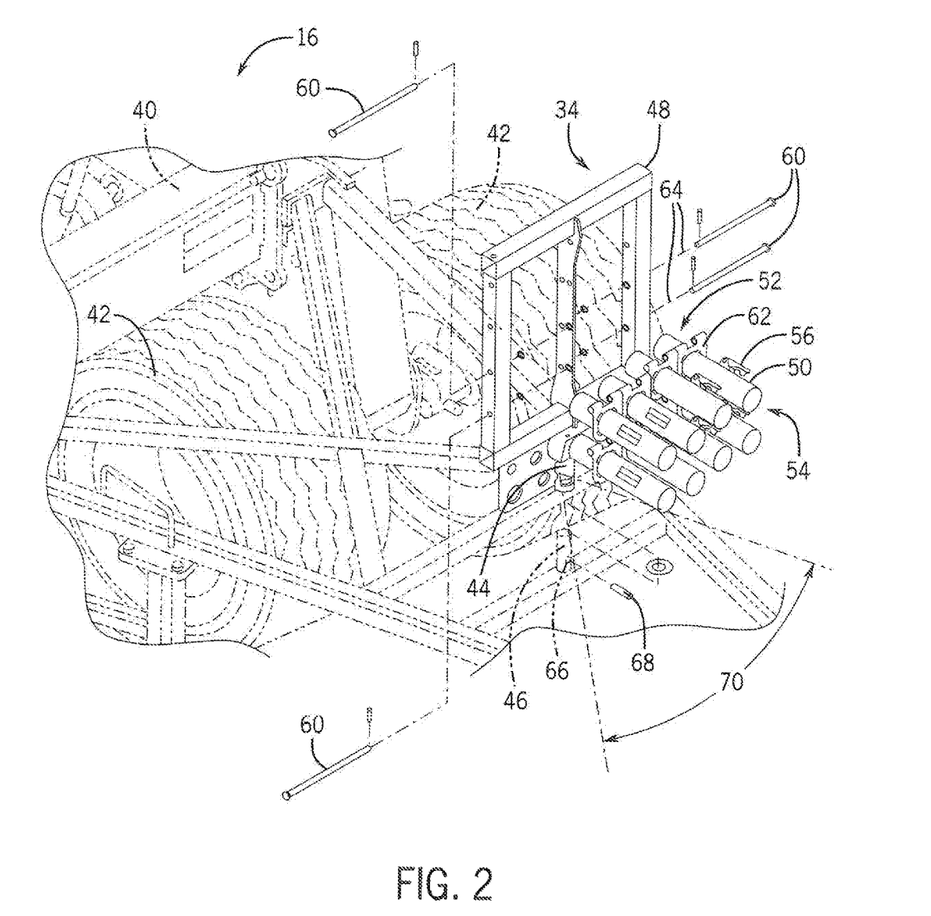
FIG. 2 is an isometric view of the manifold of FIG. 1.
Figure 5:
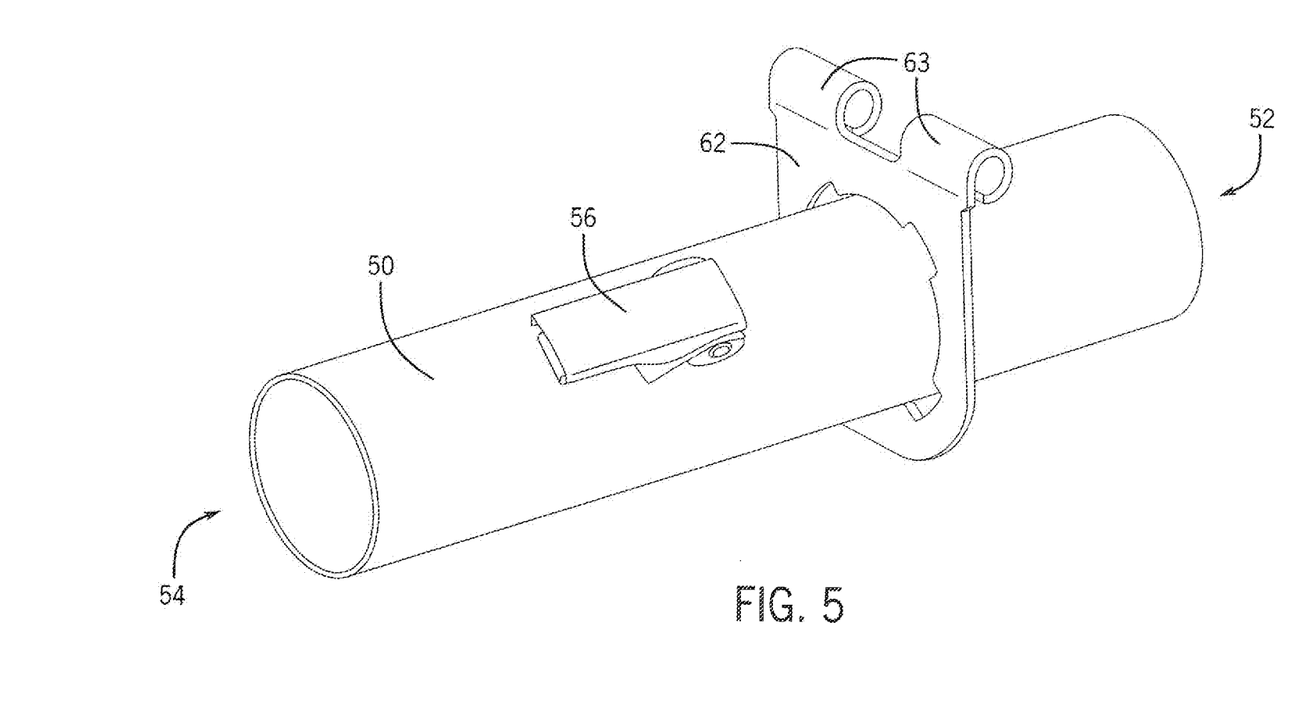
FIG. 5 is an isometric view of a coupler which may be used in the manifolds of FIGS. 1-4.

Referring now to FIG. 2, an isometric view of the manifold 34, mounted in relation to the air cart 16, as shown in FIG. 1 by way of example, is provided according to an aspect of the invention. A chassis 40 of the air cart 16 may be supported by multiple wheels 42. The hitching point 21 (shown in FIG. 1) may mechanically interconnect with the chassis 40 for towing the chassis 40 and, in turn, the air cart 16. The manifold 34 may be vertically supported by a post 44 held by a receptacle 46 that is rigidly configured with the chassis 40. The manifold 34 may have a frame 48 supporting multiple couplers 50. Each coupler 50 may have a first end 52 for receiving a primary hose from the air cart 16 (primary hose 22a) and a second end 54 having a connector 56 configured to retain a primary hose of another agricultural product delivery system, such as the air drill 12 (primary hoses 22b), when mounted to the coupler 50 (see also FIG. 5).

In one aspect, a primary hose 22a may attach on the first end 52, proximal to the body of the agricultural product delivery system supporting the manifold 34, in a manner providing greater security and rigidity and which may require tools, such as by using a strong hose clamp. In addition, a primary hose 22b may attach on the second end 54, distal to the body of the agricultural product delivery system, in a manner providing greater flexibility and convenience and which may avoid using tools, such as by using a quick attached connector (connector 56) configured to clip onto the primary hose mounted over the coupler 50 upon pressing down on a base of the connector 56 and subsequently releasing over the hose. Of course, in an alternate configuration, the manifold 34 may be mounted in relation to the air drill 12, in which case each coupler 50 may receive a primary hose of the air drill 12 (primary hoses 22b) at the first end 52 and a primary hose of the air cart 16 (primary hose 22a) at the second end 54.

Longitudinal members 60 may be mounted transversely with respect to the frame 48 and parallel to the ground. In addition, hangers 62 may be mounted to the longitudinal members 60 for individually supporting the couplers 50. The hangers 62 may include support elements 63 having apertures for receiving longitudinal members 60 there through for pivotably mounting to the longitudinal members 60 (see also FIG. 5). The longitudinal members 60 may define multiple axes 64 which may, in turn, define rows for the couplers 50. The hangers 62 may independently provide rotation for each of the couplers 50 in the first plane perpendicular to the ground by each rotating along the axes 64 defined by the longitudinal members 60.

In addition, the post 44 may include a slot 66 configured to receive a cross pin 68. The cross pin may be mounted through the post 44 to the receptacle 46. Accordingly, the post 44 may be configured to rotate within a boundary 70 defined by the slot 66, limited by the cross pin 68, to allow the frame 48 to rotate in a second plane parallel to the ground. By providing the foregoing articulated control in the first and second planes, the manifold 34 may be conveniently mounted proximal to the hitching point 21 without concern for stresses that flexing primary hoses 22 could impart (such as during bumps or turns).

Figure 3:
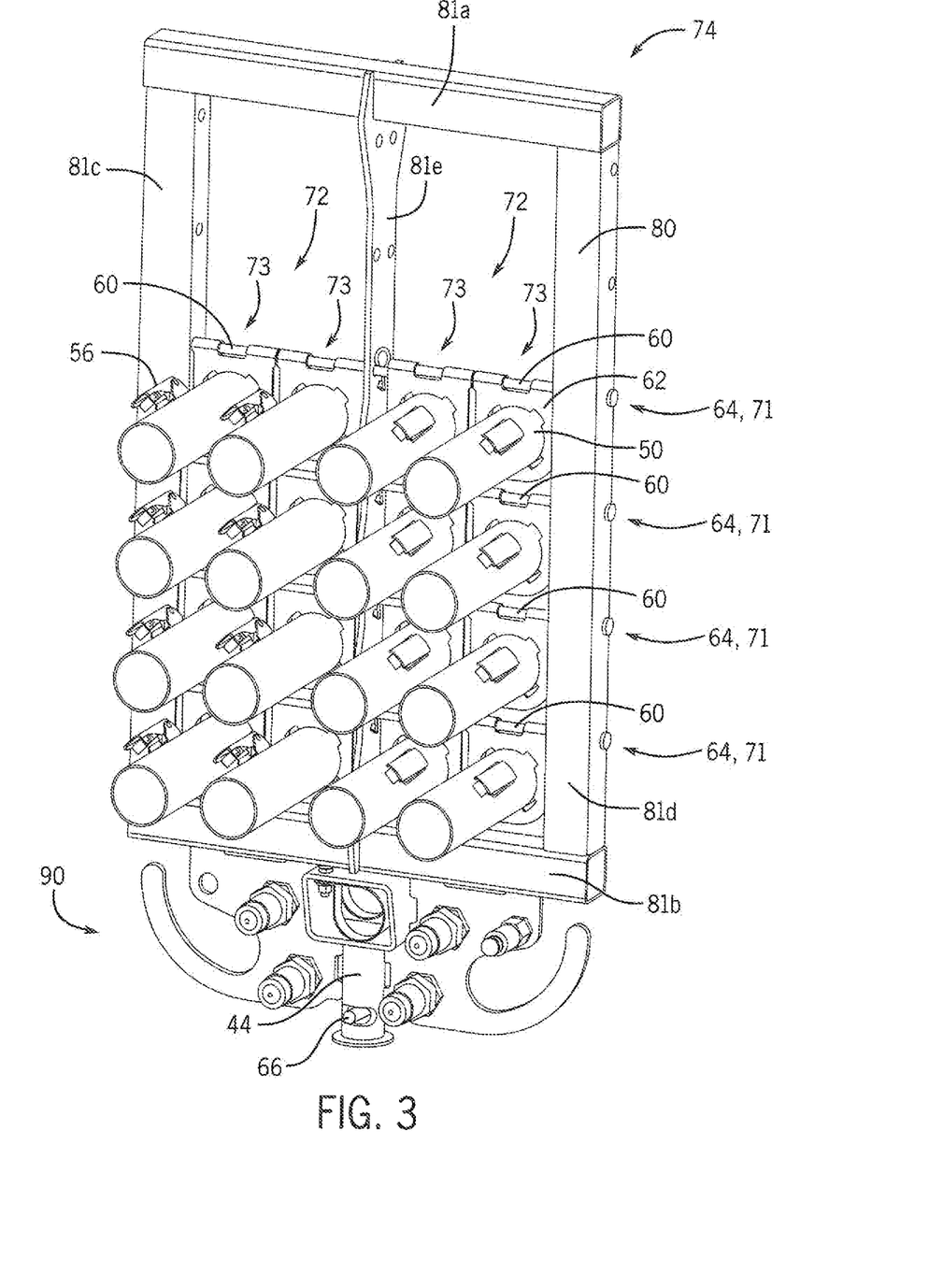
FIG. 3 is an isometric view of an alternative manifold according to an aspect of the present invention.

Referring now to FIG. 3, an isometric view of an alternative manifold configuration is provided according to the present invention where like reference numerals denote like components. Here, an air pack manifold 74 may include a frame 80 which may accommodate up to twelve longitudinal members 60. In one aspect, the frame 80 may include upper and lower support beams 81a and 81b, respectively, which may be joined by left, right and center support beams 81c, 81d and 81e, respectively, which may be manufactured from a hardened material such as steel. The longitudinal members 60 may be mounted transversely with respect to the frame 80, and parallel to the ground, through opposing apertures in the left, right and center support beams 81c, 81d and 81e, respectively.

The longitudinal members 60 may be divided into longitudinal member rows 71 and longitudinal member columns 72 (eight longitudinal members 60 are shown in FIG. 3, divided into four longitudinal member rows 71 and two longitudinal member columns 72). Each longitudinal member 60 may support one or more hangers 62, and each hanger 62 may, in turn, support a coupler 50. The couplers 50 may be disposed in multiple rows corresponding to the longitudinal member rows 71, and in multiple hanger columns 73 which may be subdivisions of the longitudinal member columns 72 (sixteen couplers 50 are shown in FIG. 3, disposed in four rows corresponding to the longitudinal member rows 71 and in four columns corresponding to the hanger columns 73, although the aspect of FIG. 3 could accommodate up to twenty-four couplers 50). Accordingly, the couplers 50 may pivot or rotate in the first plane along the axes defined by longitudinal member rows 71.

Figure 4:
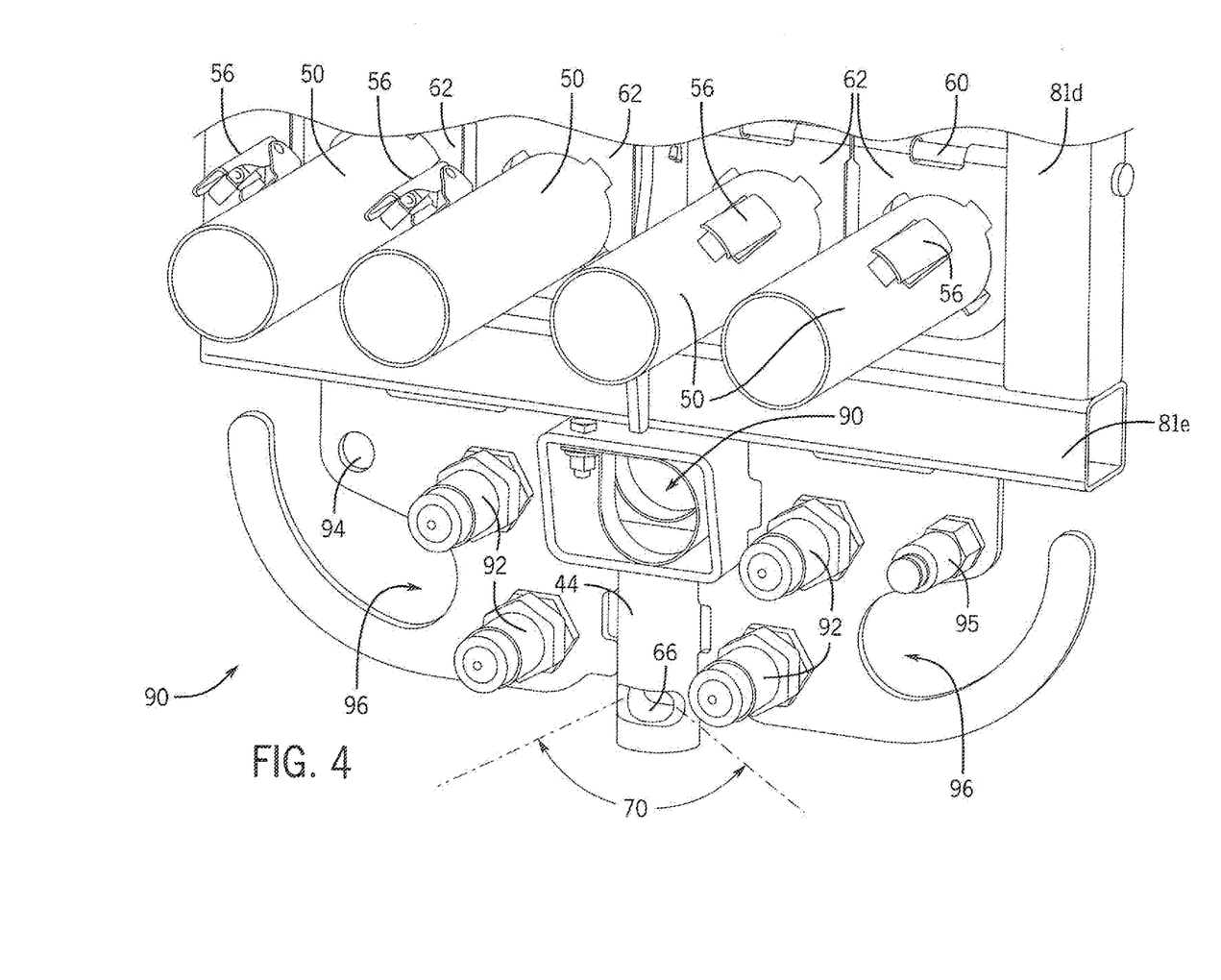
FIG. 4 is a detailed view of a lower portion of the manifold of FIG. 3 illustrating a post for vertically supporting a frame of the manifold and a support assembly.

With additional reference to FIG. 4, the manifold 74 may include the post 44 for vertically supporting the frame 80 of the manifold 74. The post 44 may include the slot 66 configured to receive the cross pin 68. The cross pin may be mounted through the post 44 to the receptacle 46. Accordingly, the post 44 may be configured to rotate within the boundary 70 defined by the slot 66, limited by the cross pin 68, to allow the frame 48 to rotate in the second plane parallel to the ground.

The manifold 74 may also provide a support assembly 90. The support assembly 90 may including multiple one or more hydraulic line connectors 92, support assembly apertures 94 and support assembly holders 96 for routing and supporting the various other connections and lines which may run between the agricultural product delivery systems when in tow, such as between the air cart 16 and the air drill 12. For example, the hydraulic line connectors 92 may be adapted to allow quick connection/disconnection of hydraulic lines for motors powering the blower assemblies 25, brakes, steering control, and the like. Also, the support assembly apertures 94 and/or support assembly holders 96 may be adapted to allow fast and secure routing for electrical connectors 95 and/or electrical cables of various sizes and configurations, such as for lights, sensors and/or control systems.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A pneumatic distribution system for agricultural equipment comprising:
   a frame lying in a first plane and supporting a plurality of couplers, each coupler having a connector configured to retain a pneumatic distribution hose when mounted to the coupler, wherein each coupler is independently configured to rotate about a corresponding axis lying in the first plane; and
a post vertically supporting the frame, the post having a slot configured to receive a cross pin, wherein the post is configured to rotate within a boundary defined by the slot to allow the frame to rotate in a second plane parallel to the ground.

2. The pneumatic distribution system of claim 1, wherein the couplers are disposed in a plurality of rows and columns.

3. The pneumatic distribution system of claim 2, wherein at least 24 couplers are provided in the configuration.

4. A pneumatic distribution system for agricultural equipment comprising:
a frame supporting a plurality of couplers, each coupler having a connector configured to retain a pneumatic distribution hose when mounted to the coupler, wherein each coupler is independently configured to rotate in a first plane perpendicular to the ground;
a post vertically supporting the frame, the post having a slot configured to receive a cross pin, wherein the post is configured to rotate within a boundary defined by the slot to allow the frame to rotate in a second plane parallel to the ground; and
a longitudinal member mounted transversely with respect to the frame and parallel to the ground, wherein the couplers are configured to rotate in the first plane along an axis defined by the longitudinal member.

5. The pneumatic distribution system of claim 4, further comprising a plurality of hangers mounted to the longitudinal member, wherein each hanger supports a coupler for providing rotation in the first plane.

6. The pneumatic distribution system of claim 4, wherein the longitudinal member is among a plurality of longitudinal members defining rows.

7. The pneumatic distribution system of claim 4, wherein the connector is configured to clip onto a pneumatic distribution hose mounted over the coupler.

8. The pneumatic distribution system of claim 4, wherein the frame further comprises a support assembly including apertures configured to support distribution lines.

9. An agricultural product delivery system comprising:
a chassis supported by a plurality of wheels;
a hitching point for towing the chassis;
a plurality of primary hoses; and
a manifold vertically supported by a post mounted proximal to the hitching point, the manifold having a frame lying in a first plane and supporting a plurality of couplers, each coupler having a first end receiving a primary hose and a second end having a connector configured to retain a pneumatic distribution hose when mounted to the coupler,
wherein each coupler is independently configured to rotate about a corresponding axis lying in the first plane;
wherein the post includes a slot configured to receive a cross pin; and
wherein the post is configured to rotate within a boundary defined by the slot to allow the frame to rotate in a second plane parallel to the ground.

10. The agricultural product delivery system of claim 9, wherein the couplers are disposed in a plurality of rows and columns.

11. The agricultural product delivery system of claim 10, wherein at least 24 couplers are provided in the configuration.

12. An agricultural product delivery system comprising:
a chassis supported by a plurality of wheels;
a hitching point for towing the chassis;
a plurality of primary hoses;
a manifold vertically supported by a post mounted proximal to the hitching point, the manifold having a frame supporting a plurality of couplers, each coupler having a first end receiving a primary hose and a second end having a connector configured to retain a pneumatic distribution hose when mounted to the coupler;
a longitudinal member mounted transversely with respect to the frame and parallel to the ground;
wherein:
the plurality of couplers are configured to rotate in the first plane along an axis defined by the longitudinal member;
each coupler is independently configured to rotate in a first plane perpendicular to the ground;
the post includes a slot configured to receive a cross pin; and
the post is configured to rotate within a boundary defined by the slot to allow the frame to rotate in a second plane parallel to the ground.

13. The agricultural product delivery system of claim 12, further comprising a plurality of hangers mounted to the longitudinal member, wherein each hanger supports a coupler for providing rotation in the first plane.

14. The agricultural product delivery system of claim 12, wherein the longitudinal member is among a plurality of longitudinal members defining rows.

15. The agricultural product delivery system of claim 12, wherein the connector is configured to clip onto a primary hose mounted over the coupler.

16. The agricultural product delivery system of claim 12, wherein the frame further comprises a support assembly including apertures configured to support distribution lines.

17. The agricultural product delivery system of claim 9, wherein the agricultural vehicle is an air cart.

18. The agricultural product delivery system of claim 9, wherein the agricultural vehicle is an air drill.

19. An air seeder system comprising:
an air cart supported by a plurality of wheels, the air cart having:
a hopper configured to hold agricultural product;
a plurality of air cart hoses;
metering units configured to meter agricultural product from the hopper to the air cart hoses;
blower assemblies configured to entrain the agricultural product in the air cart hoses;
an air cart hitching point; and
a manifold vertically supported by a post mounted proximal to the hitching point, the manifold having a frame supporting a plurality of couplers, each coupler having a first end receiving an air cart hose and a second end having a connector configured to retain an air drill primary hose mounted to the coupler,
wherein the manifold further includes a plurality of longitudinal members mounted transversely with respect to the frame and parallel to the ground;
wherein each coupler is independently configured to rotate in a first plane perpendicular to the ground;
wherein the couplers are configured to rotate in the first plane along an axes defined by the longitudinal members;
wherein the post includes a slot configured to receive a cross pin; and wherein the post is configured to rotate within a boundary defined by the slot to allow the frame to rotate in a second plane parallel to the ground; and an air drill supported by a plurality of wheels, the air drill having:
  an air drill hitching point in communication with the air cart hitching point;
  a plurality of headers;
  a plurality of air drill primary hoses, each air drill primary hose coupling a header to a second end of the manifold;
  a plurality of row units; and
  a plurality of air cart secondary hoses, each air cart secondary hose coupling a header to a row unit,
  wherein each row unit is configured to open a row in a field, deposit agricultural product in the row, and close the row over the agricultural product.

* * * * *